(12) United States Patent
Schmid et al.

(10) Patent No.: US 11,214,018 B2
(45) Date of Patent: Jan. 4, 2022

(54) MICRO-CHANNELED AND NANO-CHANNELED POLYMER FOR STRUCTURAL AND THERMAL INSULATION COMPOSITES

(71) Applicant: South Dakota Board of Regents, Pierre, SD (US)

(72) Inventors: Eric D. Schmid, Rapid City, SD (US); David R. Salem, Rapid City, SD (US)

(73) Assignee: South Dakota Board of Regents, Pierre, SD (US)

( * ) Notice: Subject to any disclaimer, the term of this patent is extended or adjusted under 35 U.S.C. 154(b) by 293 days.

(21) Appl. No.: 15/520,976

(22) PCT Filed: Oct. 23, 2015

(86) PCT No.: PCT/US2015/057199
§ 371 (c)(1),
(2) Date: Apr. 21, 2017

(87) PCT Pub. No.: WO2016/114837
PCT Pub. Date: Jul. 21, 2016

(65) Prior Publication Data
US 2018/0222127 A1    Aug. 9, 2018

Related U.S. Application Data

(60) Provisional application No. 62/067,855, filed on Oct. 23, 2014.

(51) Int. Cl.
*B29C 67/20* (2006.01)
*B82Y 30/00* (2011.01)
(Continued)

(52) U.S. Cl.
CPC ............ *B29C 67/202* (2013.01); *B82Y 30/00* (2013.01); *E04B 1/806* (2013.01);
(Continued)

(58) Field of Classification Search
CPC ...... B32B 3/20; B29C 67/202; B29C 47/0007
See application file for complete search history.

(56) References Cited

U.S. PATENT DOCUMENTS

| | | |
|---|---|---|
| 4,139,024 A | 2/1979 | Adorjan |
| 4,849,276 A | 7/1989 | Bendig et al. |
| | (Continued) | |

FOREIGN PATENT DOCUMENTS

| | | |
|---|---|---|
| WO | 12042008 A3 | 12/2008 |
| WO | 2009137038 A2 | 11/2009 |
| | (Continued) | |

OTHER PUBLICATIONS

South Dakota Board of Regents, PCT/US15/57199, "International Search Report", dated Oct. 23, 2015.
(Continued)

*Primary Examiner* — Jacob T Minskey
(74) *Attorney, Agent, or Firm* — McKee, Voorhees & Sease, PLC

(57) ABSTRACT

The invention relates to micro-channeled and/or nano-channeled polymer compositions for structural and thermal insulation composites and methods of preparing the same. The composites can be tailored to achieve desired mechanical and thermal insulation properties.

10 Claims, 16 Drawing Sheets

(51) Int. Cl.
  *E04B 1/80* (2006.01)
  *B29K 105/12* (2006.01)
  *B29K 101/12* (2006.01)
  *B29L 31/10* (2006.01)

(52) U.S. Cl.
  CPC .... *B29K 2101/12* (2013.01); *B29K 2105/122* (2013.01); *B29K 2995/0015* (2013.01); *B29L 2031/10* (2013.01)

(56) References Cited

U.S. PATENT DOCUMENTS

| | | | |
|---|---|---|---|
| 6,387,492 B2 | 5/2002 | Soane et al. | |
| 7,179,846 B2 | 2/2007 | Dreier | |
| 8,617,702 B2 | 12/2013 | Jha et al. | |
| 2011/0126911 A1* | 6/2011 | Kobrin | B32B 7/02 137/1 |
| 2012/0058174 A1* | 3/2012 | West | A61L 27/56 424/443 |

FOREIGN PATENT DOCUMENTS

| | | | |
|---|---|---|---|
| WO | 2010004437 A3 | 1/2010 |
| WO | 2011133778 A2 | 10/2011 |
| WO | 2014070822 A1 | 5/2014 |

OTHER PUBLICATIONS

South Dakota Board of Regents, PCT/US15/57199, "Written Opinion of the International Searching Authority", dated Oct. 23, 2015.

\* cited by examiner

MICRO-CHANNELED AND NANO-CHANNELED POLYMER FOR STRUCTURAL AND THERMAL INSULATION COMPOSITES

CROSS-REFERENCE TO RELATED APPLICATIONS

This application is a U.S. National Phase Application of PCT/US2015/057199 filed Oct. 23, 2015, which claims priority under 35 U.S.C. § 119 to Provisional Application Ser. No. 62/067,855, filed Oct. 23, 2014. The entire contents of which are hereby expressly incorporated by reference in its entirety including, without limitation, the specification, claims, and abstract, as well as any figures, tables, or drawings thereof.

STATEMENT AS TO FEDERALLY SPONSORED RESEARCH

This invention was made with government support under NASA EPSCoR Grant number NNX12AB17G. The Government has certain rights in this invention.

FIELD OF THE INVENTION

The invention relates to micro-channeled and nano-channeled composites for structural, thermal insulation materials and methods of making the same.

BACKGROUND OF THE INVENTION

Low-density materials, such as aerogels, polymer foams, and porous ceramics, demonstrate a variety of exceptional properties, including high porosity and surface area, tailorable transparency, and low thermal conductivity. Of these, aerogels are considered the state-of-the-art material, and have been used in a wide variety of applications such as catalyst support systems, battery electrodes, Cerenkov detectors, and space insulation materials. However, the high fraction of void space in low density materials limits their structural capability, especially in aerogels. The incorporation of crosslinking agents, clays, natural and synthetic fibers, and functionalized nanoparticles, and the use of new processing strategies, have shown mild degrees of success at increasing the mechanical properties while retaining high fractions of void space. For applications requiring thermally insulating, high strength materials (such as future space exploration missions), developing materials with optimized properties is of extreme importance. However, there exists a wide range of applications for these materials which are both strong and insulating outside of space exploration (some are already mentioned above), such as home and building insulation, clothing, food storage containers, and others.

In the application of space exploration materials, these advanced composites are expected to require thermal insulation properties in the range of about 10-50 mW/(m−K) and mechanical properties suitable to support an anticipated lunar habitat internal pressure of about 30 kPa. NASA has committed to establishing a permanent human presence beyond that of the International Space Station as early as the year 2030, with preliminary colonization occurring on the moon. For this lunar colony to be successful, new composite materials must be developed which demonstrate optimized properties capable of dealing with the harsh conditions of an extra-terrestrial environment. These composite materials must protect against the extreme lunar temperature range and must also exhibit mechanical properties suitable for habitat construction. Furthermore, these composite materials must be lightweight so their transport can be economically viable. Typical insulation materials contain high fractions of trapped air. Although this can achieve desirable thermal insulation capability, it also creates limitations in achievable mechanical properties. This is the case observed in brittle aerogels. While aerogels and closed cell foam materials may have their niche in certain applications, new materials must be developed to provide the needed balance of demanding property requirements. By exploiting the unique advantages of nanoscale materials, unique material properties may be achieved.

Thus an objective of the present invention is to provide thermal insulation materials that have improved physical properties.

Still a further object of the invention is to provide methods of making such thermal insulation materials.

Other objects and advantages of the invention are can be ascertained in the detailed description and figures.

SUMMARY OF THE INVENTION

The invention relates to micro-channeled and/or nano-channeled polymer compositions for structural and thermal insulation composites and methods of preparing the composites. In an aspect of the invention, the composites can be tailored to achieve desired mechanical and thermal insulation properties. The use of an insulating matrix material limits heat conduction.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

DESCRIPTION OF THE FIGURES

FIG. 6A shows sequenced layers of micro- and nano-channels. FIG. 6B provides a magnified image of the central micro-channel of FIG. 6A showing rough nano-channel domain above and smooth micro-channel domain below.

DETAILED DESCRIPTION OF THE INVENTION

Figure 1:
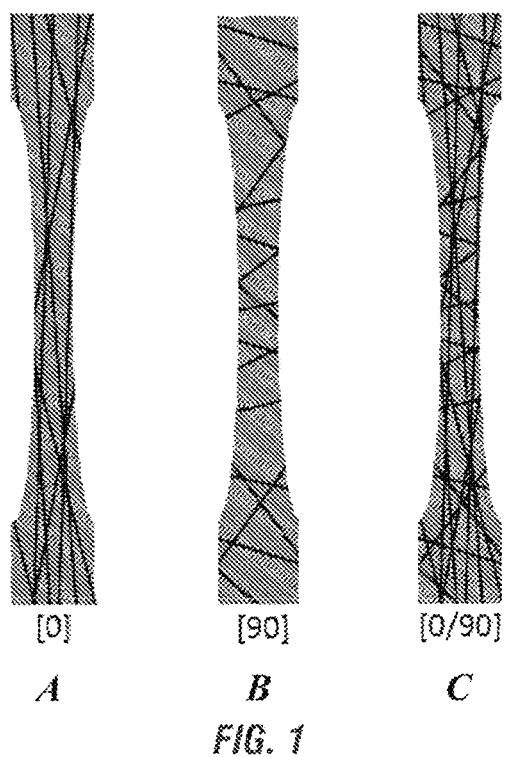
FIG. 1A-C shows a pictorial representation of micro-channels in the generalized orientation of (A) orientation [0], (B) orientation [90], and (C) and a crisscross orientation of [0/90].

The embodiments of this invention are not limited to particular polymers or nanofibers, or particular end uses, which can vary. It is further to be understood that all terminology used herein is for the purpose of describing particular embodiments only, and is not intended to be limiting in any manner or scope. So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

As used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "microscale" and the related prefix "micro-" as used herein is intended to refer to items that have at least one dimension that is one or more micrometers and less than one millimeter.

The term "micro-channel" refers to channels having at least part of the channel diameter at least one micrometer and less than one millimeter.

The term "nanoscale" and the related prefix "nano-" as used herein is intended to refer to measurements that are less than one micrometer.

The term "nano-channel" refers to channels having at least part of the channel diameter less than one micrometer.

The term "polymer fiber assembly" refers to nanofibres and/or microfiber non-woven mats, woven mats, knitted fabrics, single or multi-layers of unidirectional fibers in any orientation.

Micro-Channeled and Nano-Channeled Materials

The present invention relates to micro-channeled and nano-channeled materials. The micro- and nano-channeled materials have many advantages over existing thermal insulation composites. For example, the micro- and nano-channeled materials have low density, good rigidity and strength measurements, and low thermal conductivity (i.e. high thermal insulation value). The compositions utilize nano-diameter channels (instead of pores) to prevent air flow, thus limiting convective heat transfer (via the Knudsen effect). The nano-channeled materials have demonstrated lower thermal convection, which is consistent with expectations based on the Knudsen effect. The use of an insulating matrix material limits heat conduction, while additives can inhibit radiative heat transfer, thus achieving an even lower effective thermal conductivity. Further modifications and additives can be incorporated to increase the matrix strength for use in load-bearing structures, either on their own or as part of a layered, hybrid composite. These hybrid composites can further be augmented with additional elements to improve their multi-functionality.

The use of cylindrical channels instead of pockets or pores allows for robust mechanical properties to be retained. By increasing the number of channels per unit volume, the size of the matrix regions located between channels is reduced, thereby decreasing the available pathways for conductive energy transfer to occur. Since the thermoplastic fibers are nonwoven and thus display random orientation, conduction is difficult due to the curvature and crisscrossed nature of the resulting channels. Packing these randomly curving fibers closer together further decreases the size of the matrix regions, restricting thermal energy transfer and decreasing thermal conductivity. This effect is further enhanced when the matrix regions become sub-micron, since according to nano-scale heat transfer theory, this results in non-constant thermal conductivity owing to the closeness of the interface boundaries. In addition to enhanced insulation ability, a substantial reduction in density can be achieved, while still retaining a mechanically intact matrix network.

The insulation ability can be augmented by decreasing the diameter of the random channels. When the diameter of the hollow channels becomes smaller, the convective heat transfer becomes more difficult as molecular gas motion becomes more restricted. As the channel diameter approaches nano-scale, it becomes of the same order of magnitude as the mean free path, $\lambda$, of the gas molecules. When this occurs, gas flow becomes rarefied and molecular transport becomes difficult and limited. This is referred to as the Knudsen effect. While not wishing to be bound by the theory, it is expected that the Knudsen effect becomes evident at channel diameters of approximately $10\lambda_{air}$, or ~670 nm for molecules of air at standard temperature and pressure. This is because at these small scales, continuum theory and traditional boundary conditions of the macroscale begin to break down.

The channeled materials can be created in one approach via the removal of a sacrificial template of nonwoven thermoplastic fiber from a cured thermoset resin composite. The fiber template can be removed by any suitable method of removal that leaves behind the intact, polymer matrix. Preferred methods of removal include, but are not limited to, thermal degradation, solvation, and selective de-polymerization. The resulting hollow channels increase the insulation ability of the bulk matrix material by forcing conduction to occur around the channels, thus increasing the pathlength and reducing the conductive energy transfer through the matrix, and also by lowering the convective heat transfer through the hollow channels due to restriction of the molecular mobility of the gas molecules within them. These effects can be enhanced, respectively, by increasing bulk channel density and by decreasing channel diameter. Further, in an aspect of the invention, the channels can be selectively oriented. FIGS. 1A-C demonstrate exemplary orientations possible. In a preferred embodiment, the channels can be oriented at [0], [90], or [0/90]. In a more preferred embodiment, the channels can be oriented at [0/90].

In embodiments of the invention, the micro-channel and/or nano-channel density can be between about 20% and about 90%, preferably between about 30% and about 85%, and more preferably between about 50% and 80%. In an aspect of the micro-channeled and nano-channeled materials, the micro-channel and/or nano-channel density is greater than about 35%, preferably greater than 40%, and more preferably greater than about 50%, even more preferably greater than about 60%.

In embodiments of the invention, the ratio of micro-channel and nano-channel density can be tailored to achieve desired properties. Preferably the ratio of micro-channel density to nano-channel density is between 25:1 and 1:25, more preferably between 20:1 and 1:20, and most preferably between 15:1 and 1:15.

In embodiments of the micro-channel and nano-channel materials, the thermal conductivity (k') is less than about 120 mW/m–K, preferably less than about 100 mW/m–K, more preferably less than about 75 mW/m–K, even more preferably equal to or less than about 50 mW/m–K. In a preferred embodiment of the micro-channel and nano-channel materials k' is in the range of about 10 mW/m–K to about 50 mW/m–K.

Polymer Matrix

The micro-channeled and nano-channeled materials include a polymer matrix. The polymer matrix may be formed by self-crosslinking or non-self-crosslinking polymers. Examples of particularly suitable polymers for forming the polymer matrix include, but are not limited to, in situ polymerizing from monomers and oligomers, thermoplastic polymers, thermoset polymers, monomers and/or oligomers that are capable of polymerizing, low molecular weight polymers which are capable of chemical crosslinking, elastomers, silicones, epoxies, and ceramics. In some embodiments, the polymers for forming the polymer matrix can comprise additives, which include, but are not limited to, plasticizers, curing agents, catalysts, and combinations thereof. The monomers, oligomers, and/or polymers can be polymerized by curing and/or in situ polymerization. The polymers can be cured by suitable or preferred methods depending on the type of polymer used to form the polymer matrix. In some embodiments, preferred polymers for forming the polymer matrix have high onset of thermal degradation temperatures. In some embodiments of the invention, preferred polymers are prepared by in situ polymerization.

In embodiments of the invention, preferred thermosetting polymers include epoxies, bis-maleimides, phenolics, polyesters (vinyls or unsaturated), benzoxazines, cyanate esters, polyimides, thermosetting polyurethanes, unsaturated polyesters, polyurea, silicone. Preferred thermoplastic polymers, which can be polymerized from the monomeric or oligomeric state by the application of heat, include, but are not limited to, polyamides, polycarbonates, polyurethanes, and polybutylterephthelate. Preferred in situ polymerizing polyamides include, but are not limited to, polyamide 6 and polyamide 12, Polymer Fiber The micro-channeled and nano-channeled materials are formed by the removal of a polymer fiber. Thus, polymer fibers are initially embedded within the polymer matrix and removed to form the micro-channels and/or nano-channels. Suitable polymer fibers are those that are capable of removal from the polymer matrix, including, for example by thermal degradation, solvation, or selective de-polymerization. A factor impacting which polymer fiber is employed includes, but is not limited to, the desired polymer matrix. This is because during removal of the polymer fiber the polymer matrix must remain generally intact. For example, when employing a thermal degradation polymer fiber removal process, the polymer fiber must have a lower onset of thermal degradation temperature than the polymer matrix. Similarly, when employing solvation as the polymer fiber removal process, the polymer fiber must dissolve in the solvent while the polymer matrix must not dissolve in the solvent.

Thus, many polymers can be employed in forming the polymer fibers. Generally, the polymers must be capable of forming polymer fibers at a micro- and/or nano-scale. Suitable methods of preparing micro-fibers and nano-fibers include, but are not limited to, electrospinning, forcespinning, charge induction, drawing, melt-blown, self-assembly, template synthesis, and phase separation. A preferred method of forming micro-fibers and nano-fibers is electrospinning. Examples of particularly suitable polymers for forming the polymer fiber are thermoplastic polymers. In embodiments of the invention, preferred thermoplastic polymers include poly(lactic acid), poly(vinyl alcohol), poly (ethylene oxide), poly(caprolactone), poly(glycolide), poly (urethane), poly(styrene), cellulose acetate, anionic polyamide-6, cyclic polybutylene terephthalate c-PBT, polyethylene terephthalate, nylon, teflon, polystyrenes, polymethyl(methacrylates), polyethylenes, polypropylenes, polystyrenes, and polyvinyl chlorides.

In an aspect of the invention, the polymer matrix forming polymer has an onset of thermal degradation at least 50° C. higher than the onset of thermal degradation of the polymer fiber forming polymer, preferably at least 60° C. higher, more preferably at least 70° C. higher, most preferably at least 90° C. higher. It has been found that with onset of thermal degradation temperatures that are too close, the polymer matrix can be partially degraded. Even small amounts of degradation can impact the structural properties of the micro-channeled and nano-channeled materials. For example, in an exemplary embodiment, it was found that 3% degradation in a DGEBF polymer matrix resulted in an 80% decrease in the mechanical properties of the micro-channeled and nano-channeled materials.

Additional Ingredients

The micro- and nano-channeled materials can include a number of different additional functional ingredients selected to impart particular characteristics. For example, additives can inhibit radiative heat transfer, thus achieving an even lower effective thermal conductivity. Further modifications and additives can be incorporated to increase the matrix strength for use in load-bearing structures, either on their own or as part of a layered, hybrid composite. These hybrid composites can further be augmented with additional elements to improve their multi-functionality.

Exemplary additional functional agents include, but not limited to, dyes, fragrances, strength enhancers, insulators, and radiation blocking ingredients. In an aspect of the invention, the channels can serve as pathways to insert additional elements for improved multi-functional performance, and hybrid size-gradient materials can allow for further tailored properties and characteristics. Preferred additional functional ingredients are multifunctional and may be included in the matrix and/or in the hollow channels.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

The high-temperature degradation of neat PLA fiber and neat epoxies were examined to evaluate selective thermal degradation routes. Microfiber nonwoven mats were infused with high temperature epoxy resin by a Vacuum Assisted Resin Transfer Molding (VARTM) procedure. Fibers were selectively removed via high-temperature thermal degradation. The densities were then calculated and compared to theoretical values. Similar degradation studies were carried out on epoxy resins incorporating PLA nanofiber mats. The channels created from this nanofiber template were compared to channels created from commercially available 18.2±0.8 µm diameter PLA fiber to investigate the ability of the Knudsen effect to limit convective heat transfer in these materials.

Figure 2:
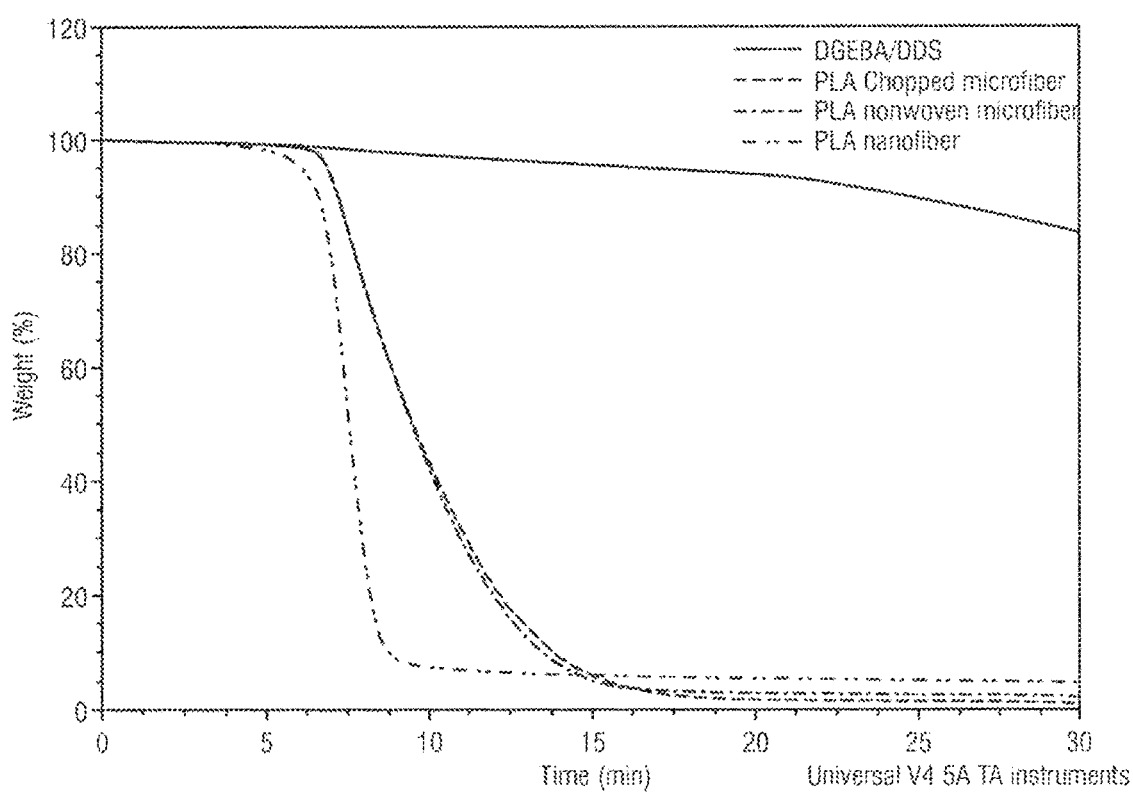
FIG. 2 is a graph showing the thermal degradation resistant epoxy compared to the isothermal degradation of chopped microfiber PLA, nonwoven microfiber PLA, and PLA nanofiber at 350° C.

Poly(lactic acid) was chosen as a sacrificial polymer due to its ability to be electrospun into nanofiber and also for its relatively low reported thermal degradation temperature of 260° C. Chopped microfiber PLA, nonwoven microfiber PLA, and PLA nanofiber samples were examined using thermal gravimetric analysis (TGA) to determine the effect of fiber diameter on both the thermal degradation onset temperature and the degradation rate. High temperature epoxy was generated from diglycidyl ether of bisphenol A (DGEBA) cured with 4,4'-diaminodiphenyl sulfone (DDS). The cured epoxy was subjected to temperatures from 250° C. to 350° C. to determine epoxy degradation resistance during PLA degradation. After 15 minutes at 350° C., the individual trials resulted in PLA mass loss of at least 95% and epoxy mass loss of less than 7% in all trials. FIG. 2 shows the isothermal degradation resistance of epoxy during the degradation of chopped microfiber PLA, nonwoven microfiber PLA, and PLA nanofiber at 350° C.

A micro-channeled epoxy was prepared and evaluated. To make the micro-channeled epoxy, nonwoven microfiber mats (fiber diameter of 18.2±0.8 µm) were infused with resin at a moderate temperature under a VARTM setup. The resin was then cured using a modified cure cycle. Finally, the resultant composite was subjected to elevated temperatures for a pre-determined time to selectively degrade the PLA fibrous mat. Applying the Rule of Mixtures, the theoretical values of the composite density were determined, before and after complete PLA removal. These values were compared to the experimentally determined values (Table 1) from which it is evident that the observed decrease in density after thermal degradation (AD) is close to the theoretical value for selective removal of the PLA.

TABLE 1

| Material | Densities (g/cc) | |
| --- | --- | --- |
| | Theoretical | Experimental |
| PLA | 1.24 | 1.241 |
| DGEBA/DDS | 1.2 | 1.230 |
| AIR | 0.001205 | — |
| 26% PLA-DGEBA/DDS | 1.21 | 1.232 |
| 26% PLA-DGEBA/DDS-AD | 0.870 | 0.885 |

Figure 3A:
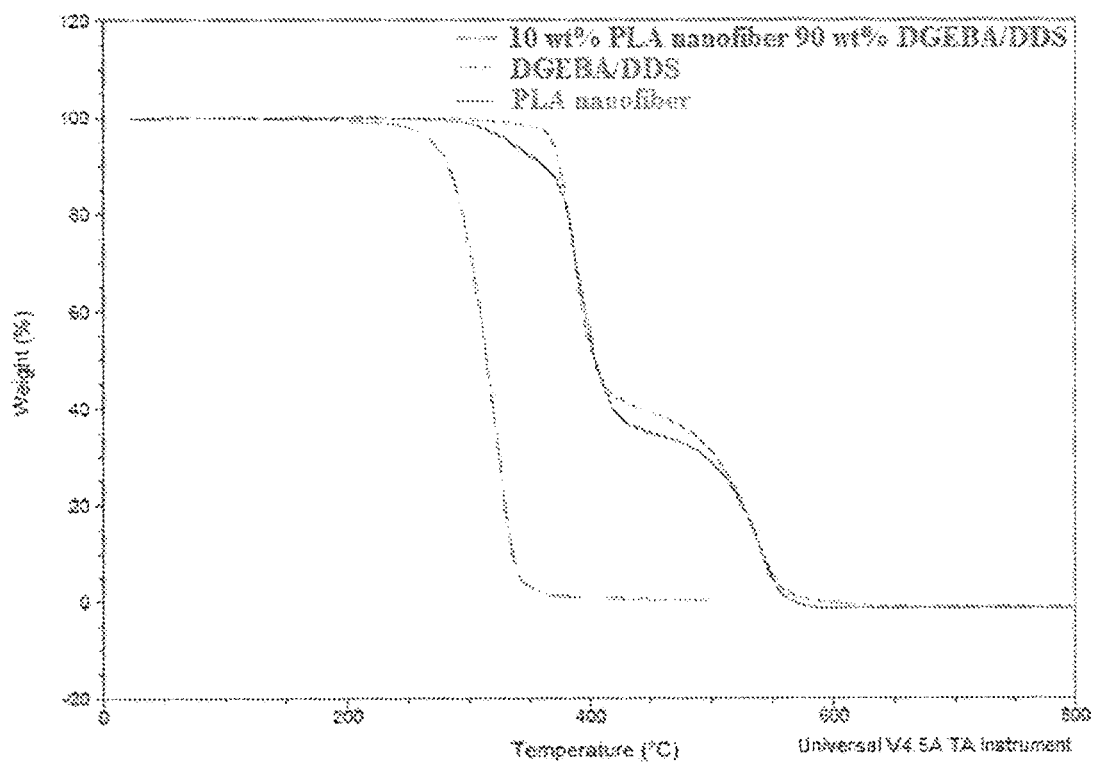
FIG. 3A is a graph showing the isothermal degradation of PLA nanofiber, DGEBA/DDS, and a composition of 10 wt. % PLA nanofiber and 90 wt. % DGEBA/DDS.
Figure 3B:
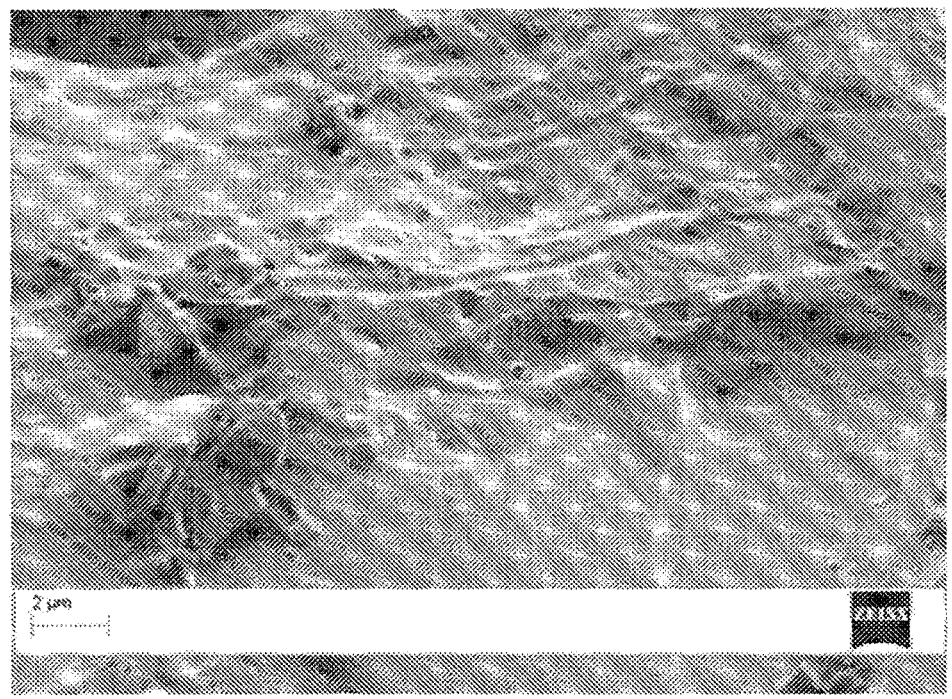
FIG. 3B is a scanning electron microscope (SEM) image of a nano-channeled DGEBA/DDS sample.
Figure 4A:
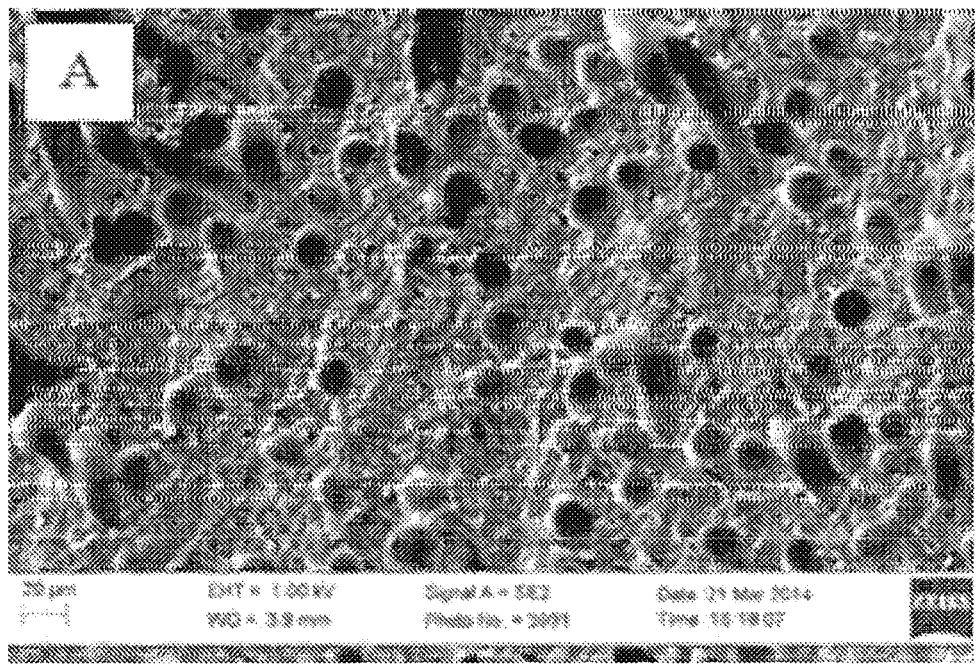
FIGS. 4A-D are SEM images of an epoxy after fiber removal showing micro-channel densities of (A) 30% micro-channels, (B) 35% micro-channels, (C) 52% micro-channels, and (D) 70% micro-channels.
Figure 4B:
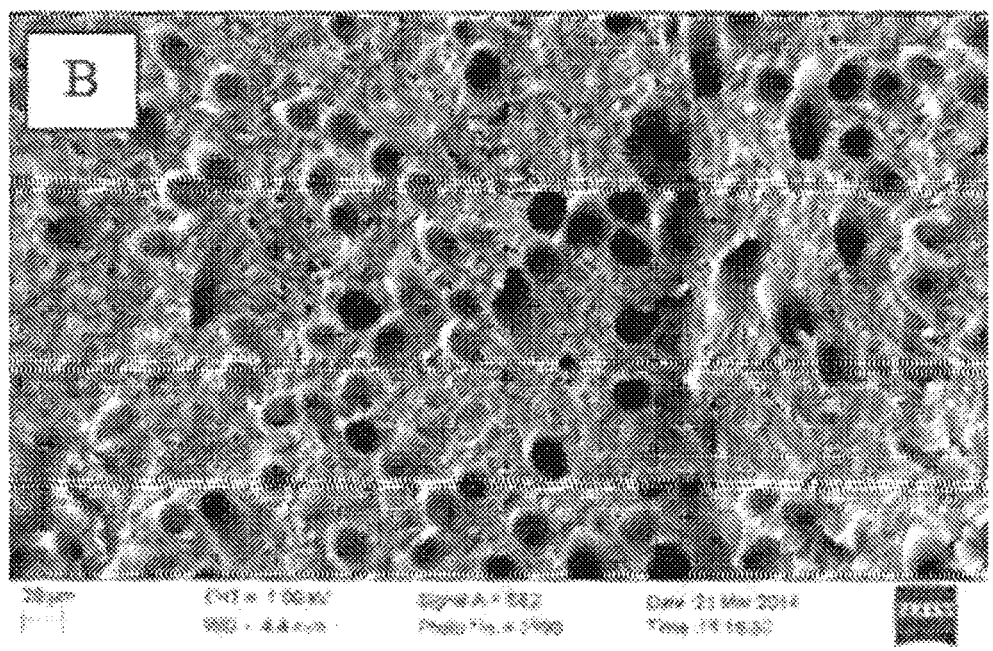
Figure 4C:
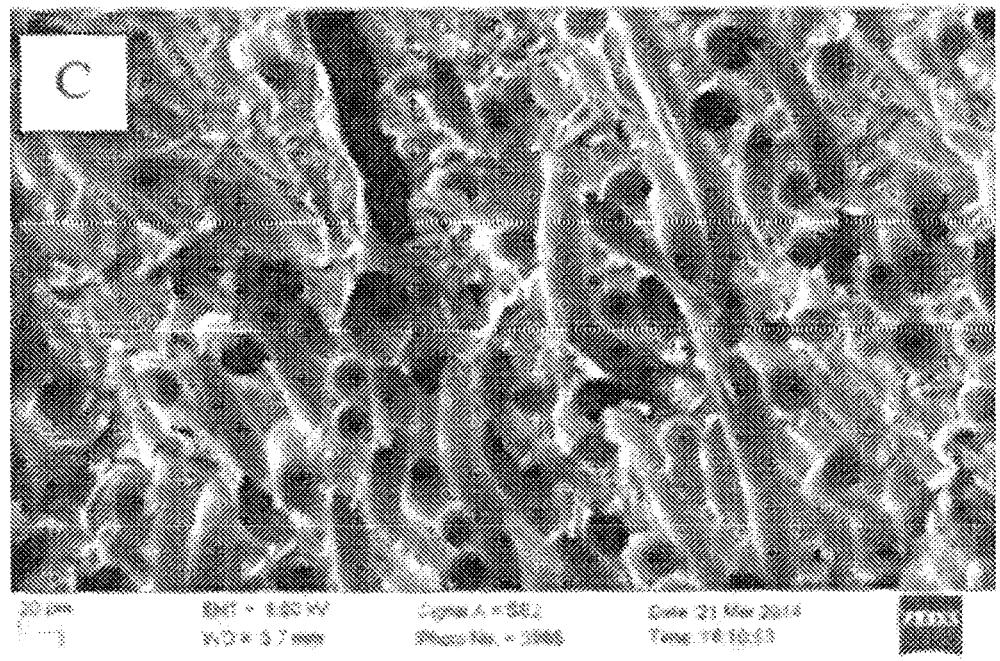
Figure 4D:
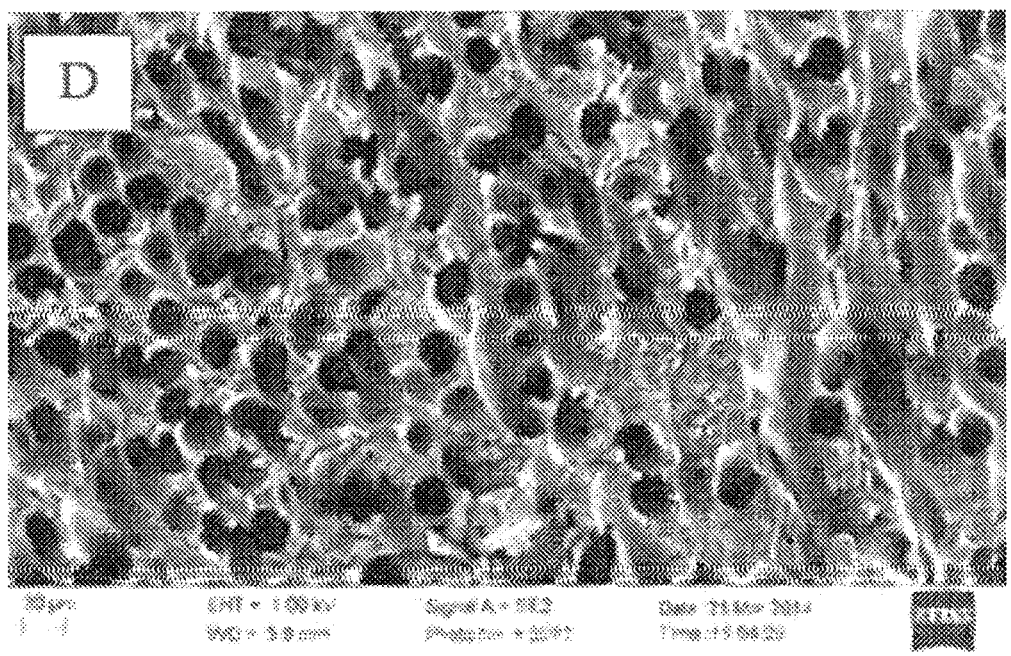

A nano-channeled epoxy was prepared and evaluated. To make the nano-channeled epoxy, PLA nanofiber mats were electrospun using an Elmarco Nanospider Lab 500®. The electrospinning variables were evaluated and optimized for this particular equipment, achieving final fiber diameters of about 500 nm. A 10% loading of the PLA nanofibers in DGEBA/DDS resulted in the expected amount of weight loss in the TGA experiment corresponding to complete removal of the PLA as shown in FIG. 3A. Moreover, exposure of the nanocomposite to a temperature of 275° C. for 60 minutes resulted in narrow channels with the expected nanoscale dimensions, as shown in the SEM image provided in FIG. 3B.

The thermal insulation and mechanical properties of the channeled epoxies were evaluated. Not only were the thermal insulation and mechanical properties evaluated, but the influence of channel volume fraction on thermal insulation was also evaluated.

Selective removal of poly(lactic acid) fiber from DGEBA/DSS epoxy via thermal degradation has been demonstrated. This selective removal creates channels in the epoxy, where channel size is dictated by the VARTM-embedded PLA fiber size. This selective removal results in a lower density material. These channeled materials remain structurally sound after the degradation process, indicating they may provide a solid framework for mechanically robust, thermal insulation applications.

While not wishing to be bound by the theory, it is anticipated, that a comparison of nano- and micro-channel epoxies with equal initial PLA content will demonstrate that the nano-channeled epoxy has a lower thermal conductivity. This is expected to result from the Knudsen effect, whereby passageways with a diameter in the region of, or less than, the mean free path of an air molecule ($\lambda_{oxygen}$=67 nm), will reduce or prevent the passage of air molecules.

Example 2

Poly(lactic acid) (PLA) nonwoven fiber mats were electrospun with an Elmarco Nanospider Lab 500® using Natureworks Ingeo™ Biopolymer 6400D PLA pellets dissolved in dichloromethane, N,N-dimethylformamide, and pyridine. For comparison, PLA mats with fiber diameters of 18.2±0.8 μm were obtained from Unitika, Ltd. Using a VARTM technique, fiber mats were infused with an epoxy consisting of diglycidyl ether of bisphenol F (DGEBF) resin and 4,4'-diaminodiphenylsulfone (DDS) curing agent. Nonwoven mats of PLA microfiber were cut and laid up for a VARTM infusion. A combined microfiber/nanofiber layup was utilized to overcome the challenge of low nanofiber permeability, thus allowing for the VARTM technique to be used in this experiment as well. To lower the viscosity of the resin and achieve better fiber wetting, the VARTM procedure was performed in an oven at moderate temperatures. To increase the fiber density, clamps were used to apply additional pressure after the infusion was performed.

After curing, specimens were cut from the sample and subjected to either high temperature processing or solvent baths to selectively remove the PLA fiber. All high temperature processing was performed in an inert oven under air. Selective degradation of the fibers was performed by submersion of the specimen in chloroform in a sealed container. Once the fiber was removed and the channels thus generated, the specimens were examined with Scanning Electron Microscopy (SEM) to determine the extent of fiber removal and characterize the morphology of the resulting channeled networks. Additionally, both fiber-epoxy composites and channeled epoxies were sent to the Kennedy Space Center Cryogenics Laboratory for measurement of the effective thermal conductivities, k', using a cryogenic heat flow meter.

A specimen, containing only 26% channel content and channel diameters of 18.2±0.8 μm, showed a decrease in effective thermal conductivity, k', of 42%, which was greater than anticipated based on a simple rule of mixtures (for air/matrix volume fractions). Thus, to further investigate the insulation ability of the micro-channeled material, higher channel densities were created by applying pressure to infused layups prior to the final curing stage. By compacting the fiber within the composite, the resulting micro-channel density was substantially increased, thus lowering the bulk material density and creating material with a much lower thermal conductivity. By applying pressure to the infused layup, excess resin was squeezed from the sample and the fiber was compacted to a greater extent. Furthermore, a hybrid microfiber/nanofiber layup approach was utilized to develop channeled materials containing both micro- and nano-channels.

Table 2 shows the micro-channel fractions ($x_{micro-channels}$), measured final densities (ρ), and effective thermal conductivities (k') of micro-channeled epoxy material. These calculations were performed by careful monitoring of the fiber and epoxy mass in each sample. Dissolution of the fiber in chloroform confirmed the fiber mass content, as the solvent does not dissolve the thermoset epoxy. After fiber removal in a 26% fiber composite specimen, the thermal conductivity was reduced by 44%, which is very similar to the previously reported initial specimen. As the channel fraction was increased to 71%, a disproportionately large decrease in k' (this time of 82%) was again observed. While not being bound by theory, this larger-than-expected insulation effect is hypothesized to originate from the increased conduction pathlength (tortuosity) resulting from the crisscrossed nature of the channel "obstacles".

TABLE 2

| Specimen | $x_{micro-channels}$ | ρ (g/cm³) | k' (mW/m K) |
|---|---|---|---|
| 0 | 0.00 | 1.27 | 278 |
| 1 | 0.26 | 0.94 | 155 |
| 2 | 0.30 | 0.87 | 142 |
| 3 | 0.36 | 0.78 | 122 |
| 4 | 0.44 | 0.68 | 102 |
| 5 | 0.51 | 0.61 | 91 |
| 6 | 0.58 | 0.52 | 77 |
| 7 | 0.64 | 0.46 | 64 |
| 8 | 0.71 | 0.36 | 51 |

SEM was used to examine the resulting micro-channeled structures of varying channel densities. As shown in FIGS. 4A-D, it is apparent that the application of pressure successfully induces higher degrees of fiber compaction, which can then be utilized to create higher bulk channel density in the micro-channeled epoxies. FIGS. 4A-D show samples containing (A) 30% micro-channels, (B) 35% micro-channels, (C) 52% micro-channels, and (D) 70% micro-channels. From the data trend in Table 2, it is observed that a 71% micro-channeled epoxy achieves an effective thermal conductivity in the region of 50 mW/mK.

Figure 5A:
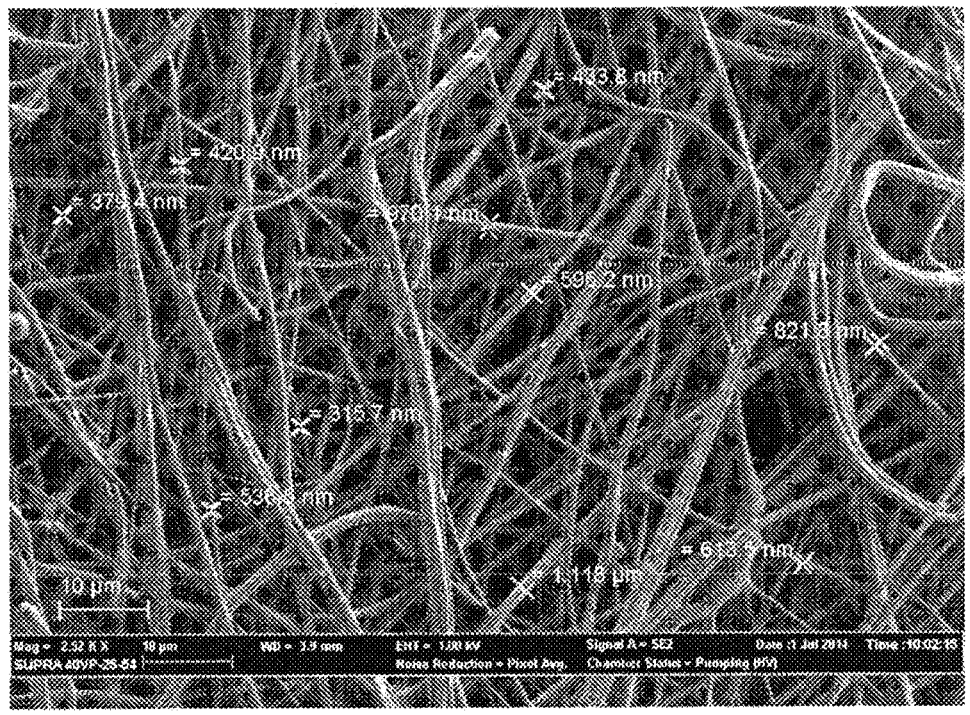
FIG. 5A is an SEM image of electrospun PLA fibers with varying diameters in the nanoscale and microscale.
Figure 5B:
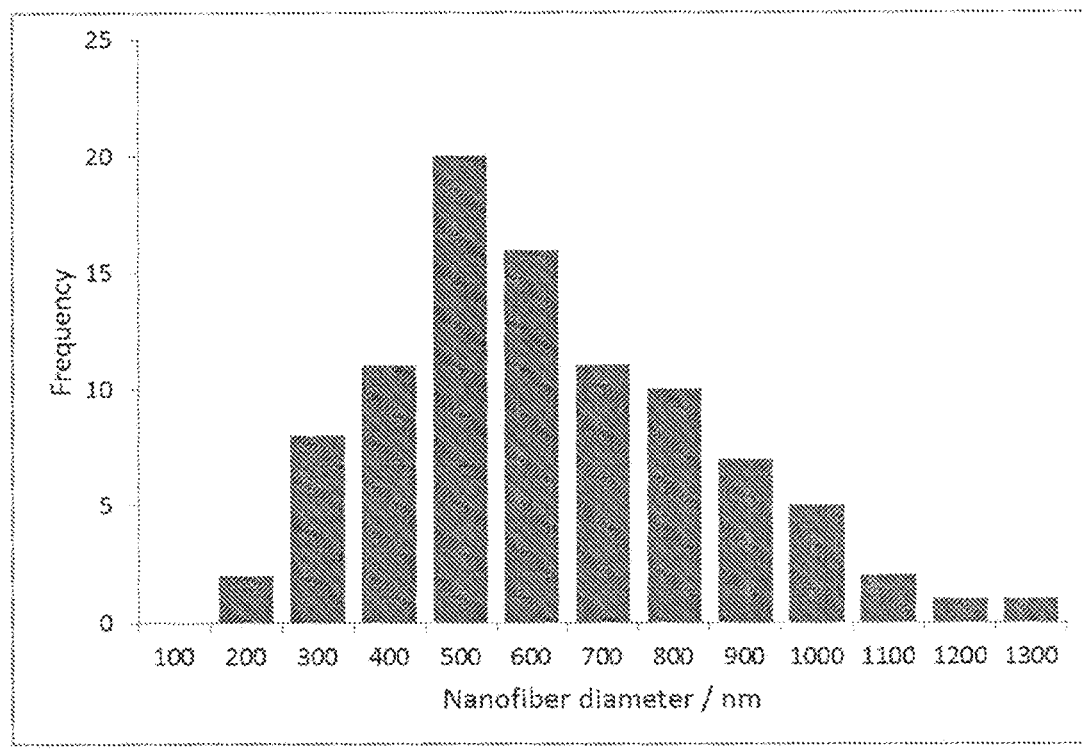
FIG. 5B is a bar graph of the frequency of fiber diameter distribution of FIG. 5A.

To utilize the Knudsen effect and limit the ability of gas molecules to convectively transfer energy, small channels on the order of 10$\lambda_{air}$, or ~670 nm or less, were created through removal of a sacrificial template made of electrospun PLA nanofiber. The electrospun nanofibers can be optimized to have diameters in this range, as shown in the SEM image of FIG. 5A. Further, FIG. 5B shows an approximate distribution of nanofiber diameters obtained from 94 measurements taken at various locations in the nanofiber mat, giving a mean diameter is 569±48 nm, α=0.05.

Figure 6A:
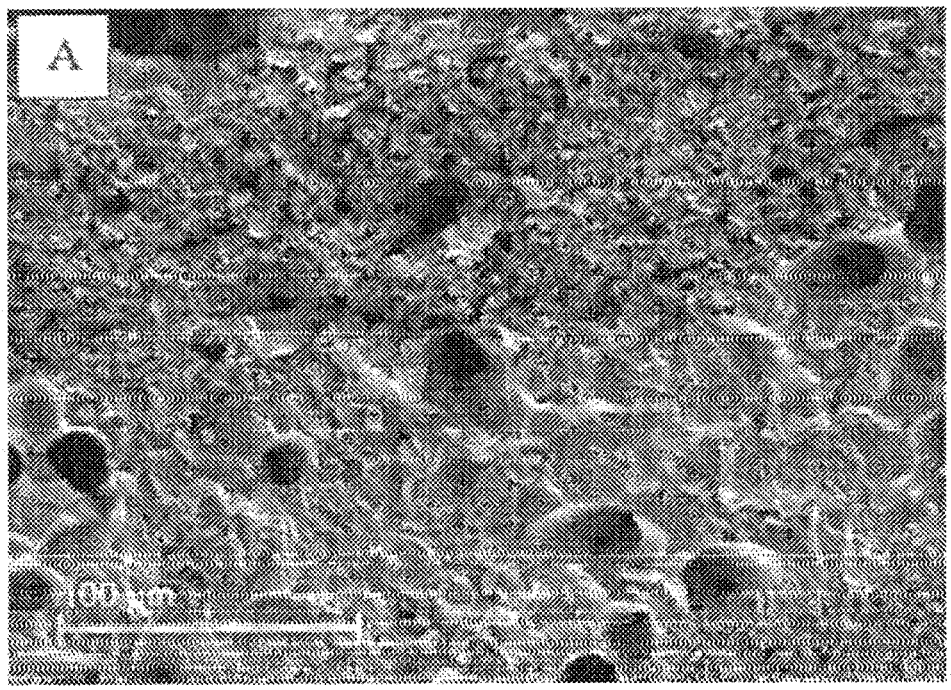
FIGS. 6A-B are SEM of micro- and nano-channels in an epoxy after fiber removal.
Figure 6B:
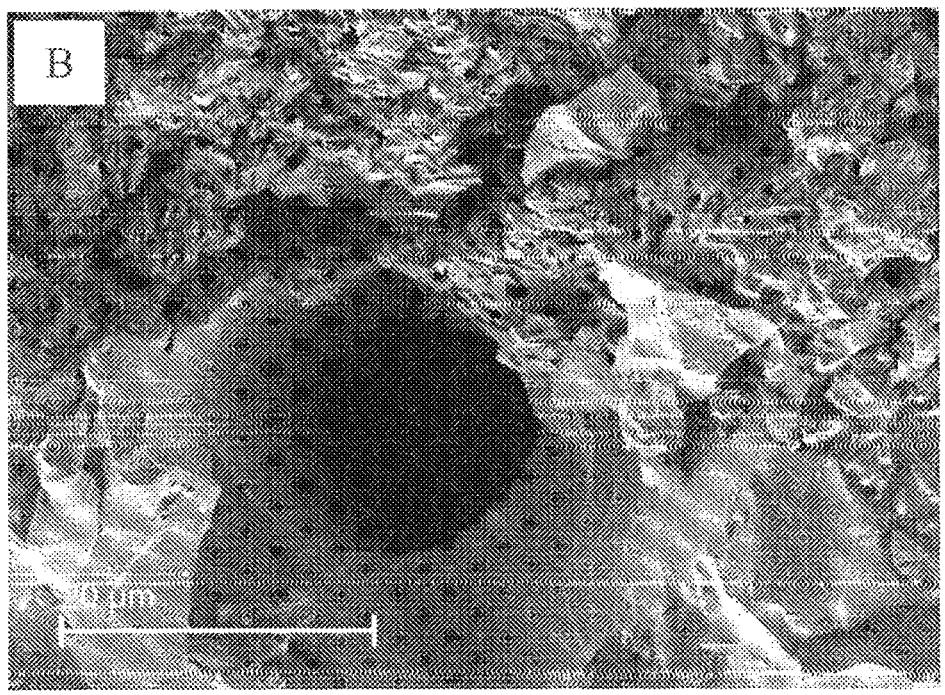

VARTM infusion of pure nanofiber mats can be difficult due to the low permeability of nano-scale materials. To improve the ease for certain embodiments, a method was devised that utilized stacked sequences of micro- and nanofiber mats. This hybrid approach allowed for simple VARTM infusion to be utilized. After fiber removal, the resulting multi-scale material was examined with SEM as shown in FIGS. 6A and B, which show channel dimensions corresponding to both the microfiber and the nanofiber dimensions. The sequenced layers of micro- and nano-channels can be seen in FIG. 6A. FIG. 6B shows a magnified view of the central micro-channel (of FIG. 6A) with rough nano-channel domain above and smooth micro-channel domain below.

As shown in FIG. 6A, at lower magnification the micro-channels are easily observed and similar to previously obtained images. However, this hybrid material consists of alternating micro- and nanofiber mats. At lower magnification, the nano-channels are not observable, but an increase in surface roughness can be seen. The epoxy between micro-channels is smooth, while in nano-channel regions the matrix looks much rougher. In FIG. 6A, four layers in the stacked sequence are observable, starting with micro-channel (smooth epoxy region) in the upper left corner of the image, followed by a layer of nano-channel (roughened epoxy), then a layer of micro-channels (smooth epoxy region again surrounding the micro-channels), and finally another nano-channel region with the rough epoxy appearance in the lower right corner. Upon zooming in on the centermost micro-channel (FIG. 6B), these regions are easily distinguished. The rough nano-channel layer is immediately above the micro-channel while the smooth epoxy indicates the micro-channel domain below. Nano-channel diameters were measured and were in the range of anticipated values based on the nanofiber template.

These nano-channeled materials limit the conductive and convective heat transfer through the material and thus can serve to enhance the material insulation. The tight packing and small nature of the nano-channels serve to increase the pathlength required for conduction to occur through the matrix, thereby lowering the conductive energy transfer. Additionally, the small diameter of the nano-channels limits convective heat transfer by restricting gas mobility since the diameters are on the same order of magnitude as the gas molecules mean free path. A specimen containing this alternating micro-channel/nano-channel morphology has been sent for evaluation at the NASA Kennedy Space Center. Specimens can be examined to evaluate the impact of micro-channel/nano-channel ratio to determine how the incorporation of nano-channels significantly impacts the insulation ability of these materials.

The micro- and nano-channeled materials demonstrated thermal conduction measurements desired for improved insulation materials while simultaneously maintaining a robust matrix structure and structural strength. The various micro-channel loading levels tested—from 25% to greater than 70%—achieved a greater-than-expected insulation effect. As the micro-channel loading level increased, so too did the insulation ability while decreasing the density of the specimens containing micro-channels alone.

Furthermore, including nano-channels in addition to the micro-channels were shown to be desirable. While not wishing to be bound by the theory, it is believed that the presence of the nano-channels can further enhance insulation ability via both the higher tortuosity of the nano-channels, which increases the pathlength for conduction through the matrix, and the small channel diameter, which can limit convective heat transfer since the channel diameter is small enough to inhibit molecular motion of the gas species.

Example 3

Poly(vinyl alcohol) (PVA) nonwoven fiber mats were electrospun with traditional rolling-drum electrospinning equipment using PVA pellets dissolved in water. The diameter of these PVA nanofibers is on the order of magnitude of 100 nm. Nonwoven mats of PLA microfiber were cut and utilized with the PVA nanofiber as part of a hybrid layup to overcome the low permeability of the nanofiber mats. The VARTM procedure was again performed in an oven at moderate temperatures where fiber mats were infused with an epoxy consisting of diglycidyl ether of bisphenol F (DGEBF) resin and 4,4'-diaminodiphenylsulfone (DDS) curing agent. Once the epoxy was cured, specimens were cut from the sample and a solvent bath of chloroform was used to selectively remove the PLA microfiber, followed by a solvent bath in water to selectively remove the PVA fiber. PLA was found to not dissolve in water, while PVA was found not to dissolve in chloroform, thereby allowing for accurate mass losses to be monitored during each dissolution phase. Once the fiber was removed and the channels thus generated, the specimens were examined with Scanning Electron Microscopy (SEM) to determine the extent of fiber removal and characterize the morphology of the resulting channeled networks.

Figure 7A:
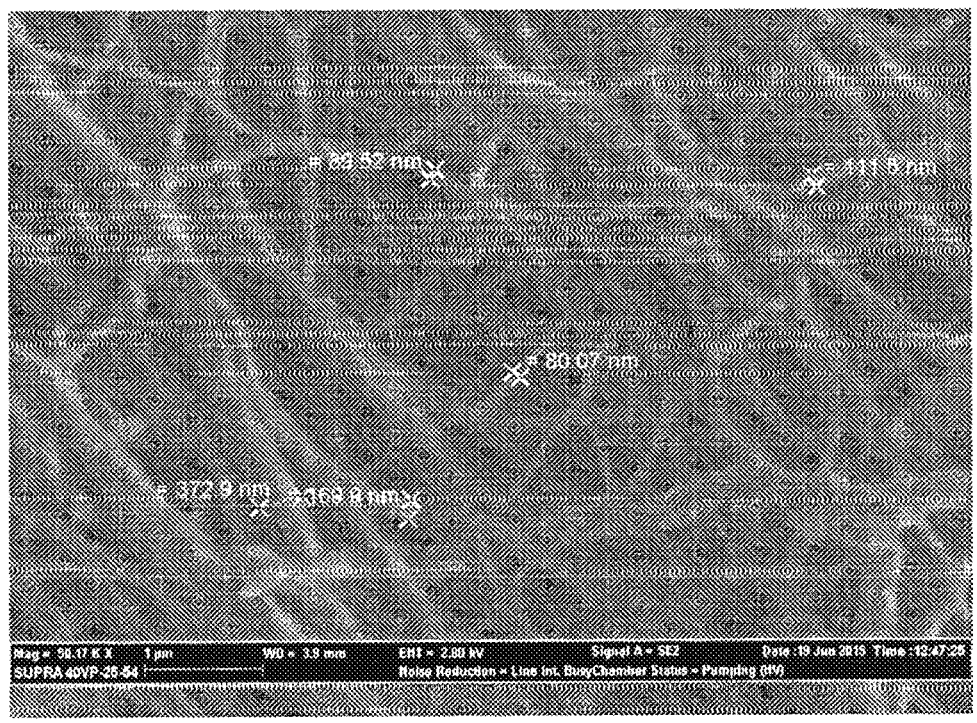
FIGS. 7A-B are SEM images of PVA fibers in the nanoscale.
Figure 7B:
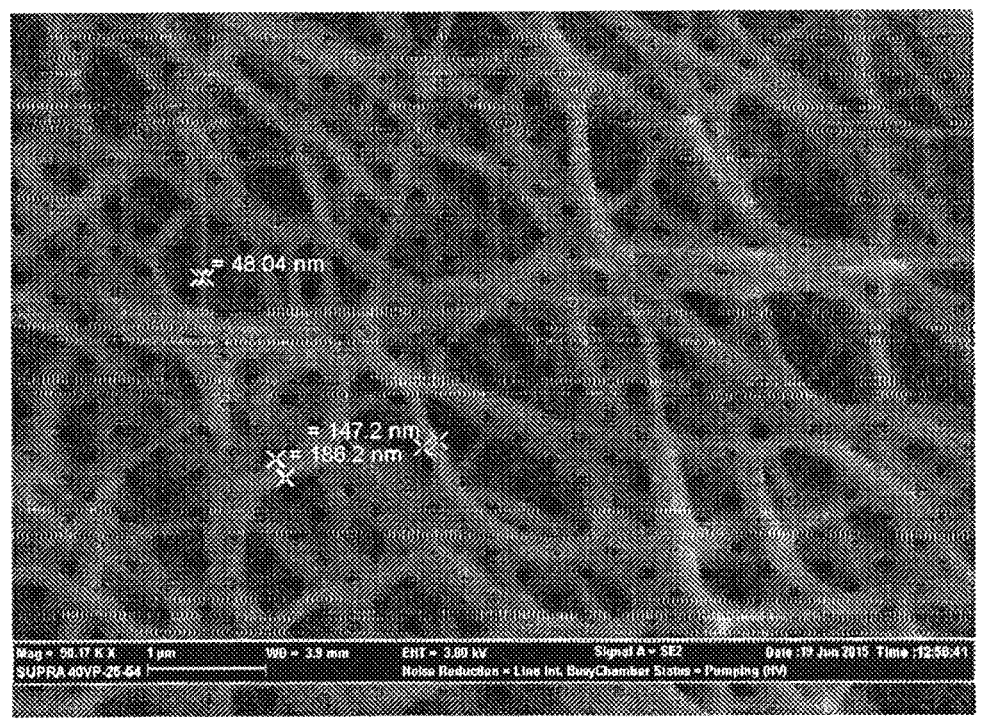
Figure 8A:
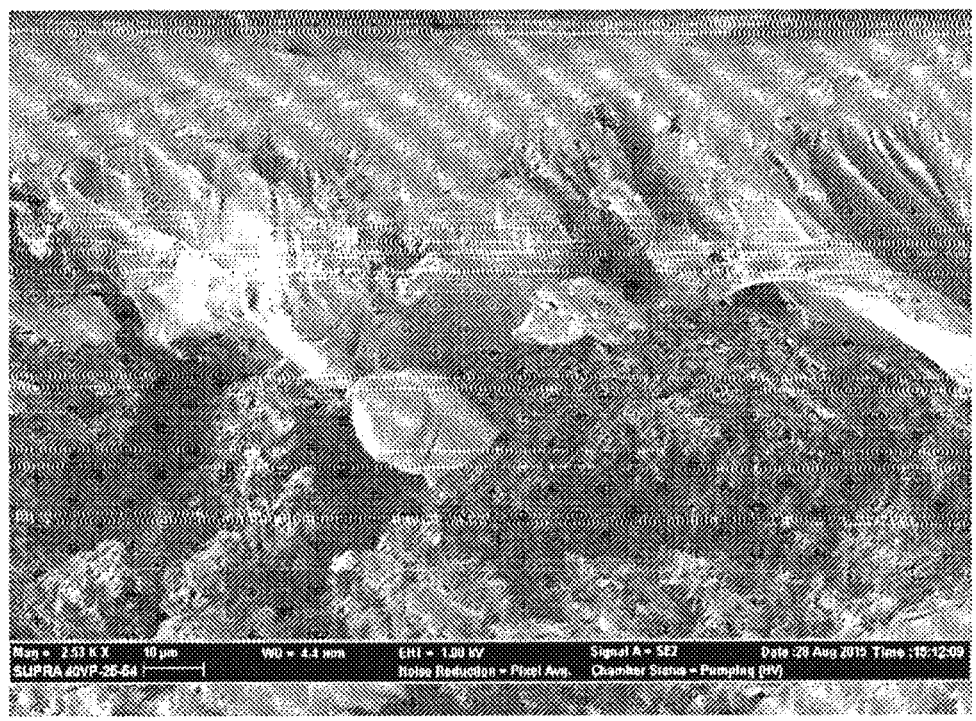
FIGS. 8A-C are SEM images of nano-channels formed after the selective dissolving of PVA fibers.
Figure 8B:
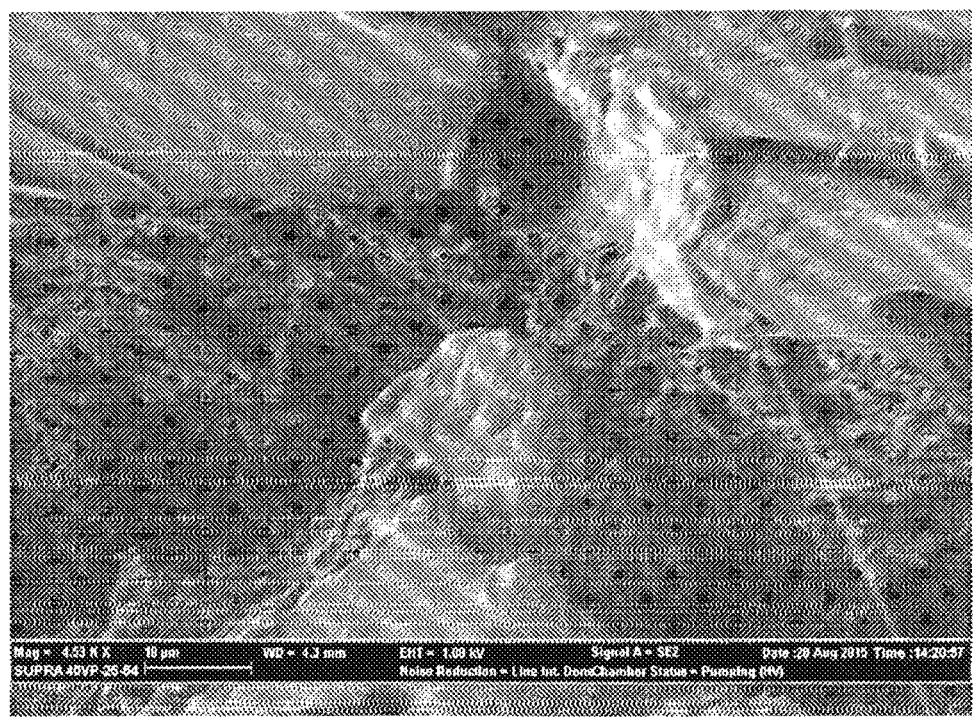
Figure 8C:
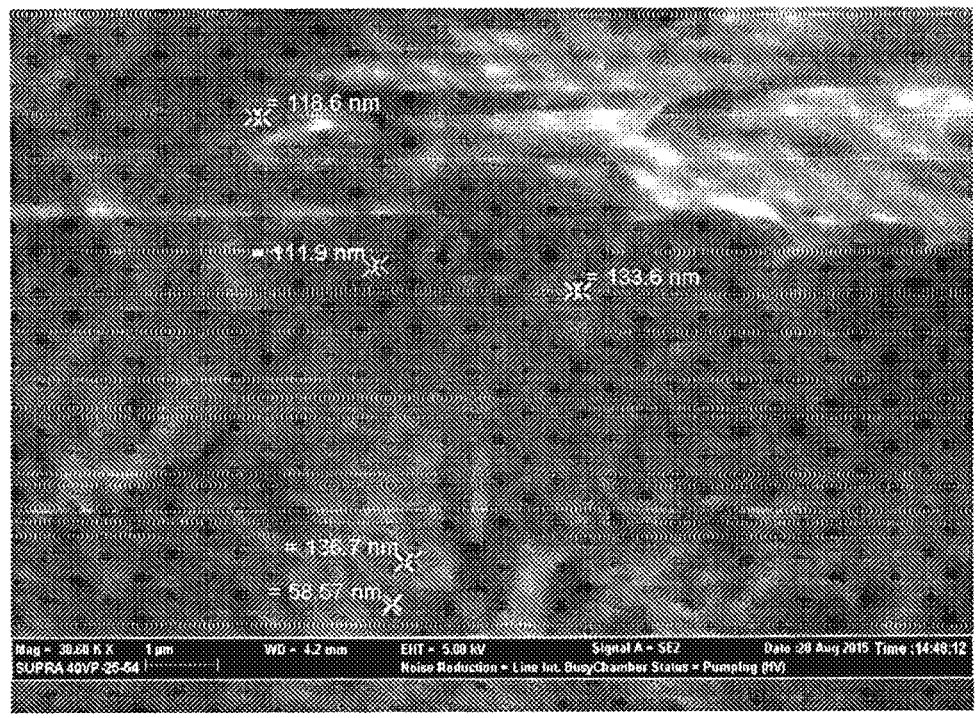
Figure 9A:
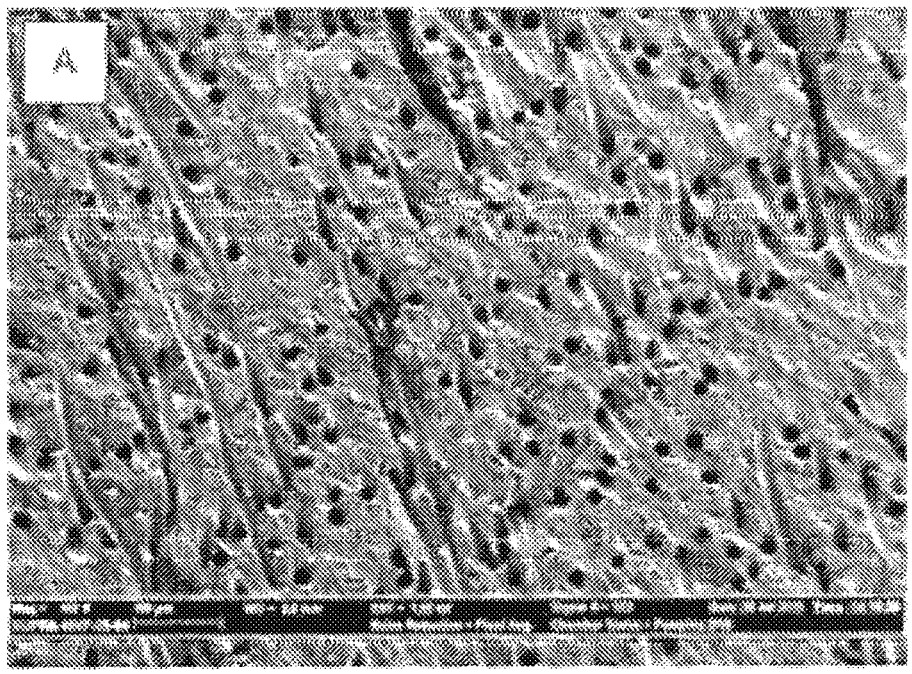
FIGS. 9A-D are SEM images of micro-channels formed after the selective dissolving of PLA fibers in orientations and fractions of (A) [0], 0.30 (B) [0], 0.60, (C) [0/90], 0.30, and (D) [0/90] 0.60.
Figure 9B:
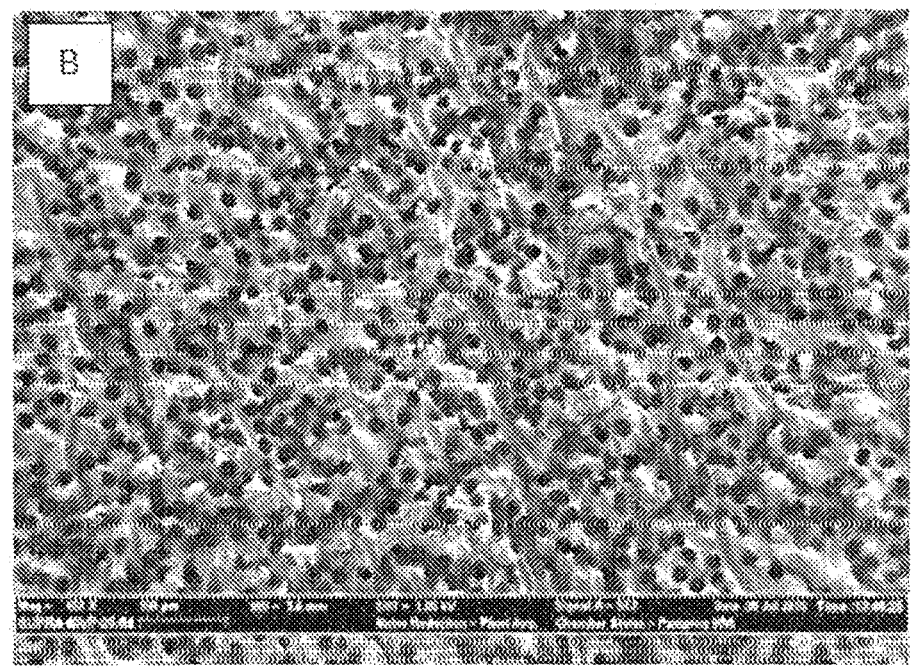
Figure 9C:
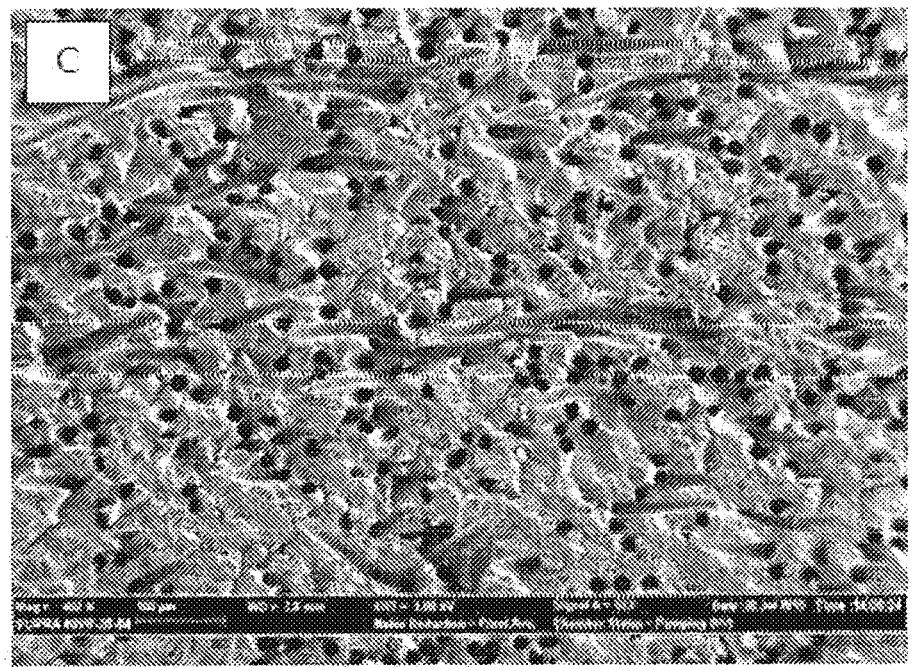
Figure 9D:
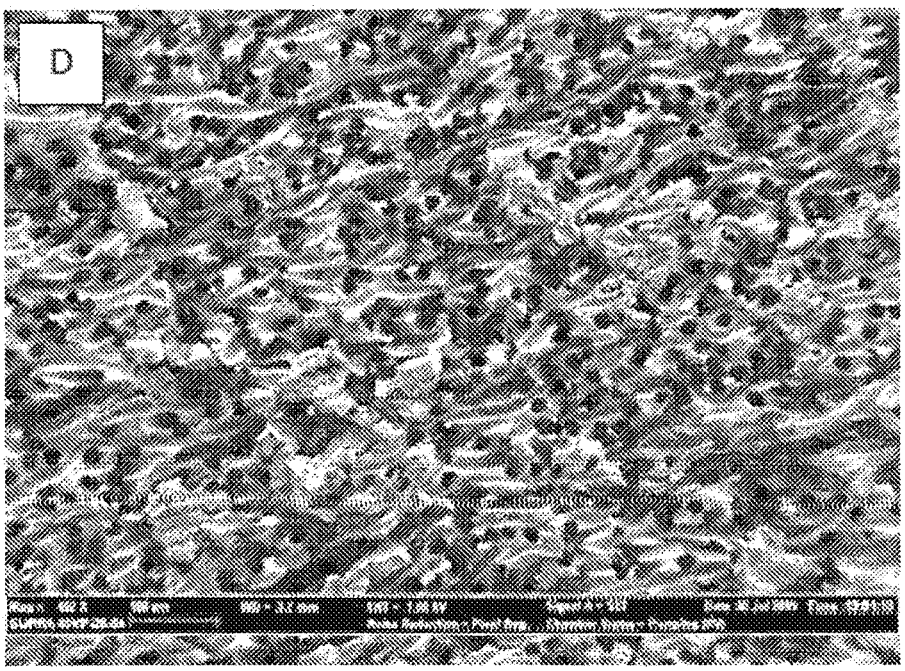

Nano-channels with diameters smaller than those reported in Example 2 were assessed. Optimization of PVA electrospinning parameters resulted in much smaller nanofibers (than in Example 2); this is shown in FIGS. 7A-B, with diameters averaging about 100 nm, and as small as 48 nm. The test demonstrated that nanofibers with small diameters (e.g., about 100 nm) dissolved well. Furthermore, the use of the PVA nanofiber template demonstrated the ability of a water soluble polymer nanofiber to be easily dissolved by an inexpensive, readily available, green solvent. The resulting nano-channels had dimensions corresponding to the PVA nanofiber template. This can be seen in FIGS. 8A-C.

Example 4

PLA microfiber was obtained from Unitika, Ltd. The diameter of these PLA microfibers was 18.2±0.8 μm. The PLA mats were stacked with microfiber mats in the same alignment (denoted as [0]) and were also stacked in an alternating 0/90 pattern (denoted as [0/90]). The VARTM procedure was again performed in an oven at moderate temperatures. Once the epoxy was cured, specimens were cut from the sample and submerged in a solvent bath of chloroform to selectively remove the PLA microfiber. Fiber compaction was utilized to obtain a range of microfiber fractions, from about 0.30 to 0.70. Once the fiber was removed and the channels generated, channel fractions of about 0.30 to 0.70 were achieved. These specimens were examined with Scanning Electron Microscopy (SEM) to determine the extent of fiber removal and characterize the morphology of the resulting channeled networks. Mechanical testing of these specimens was performed to evaluate compression, tensile, flexure, and impact properties over the range of micro-channel fractions.

Full removal of PLA microfiber resulted in appropriately reduced densities as previously reported. The change in micro-structure by alternating the microfiber mats in a [0/90] fashion is demonstrated in FIG. 9. Although the degree of orientation is limited in the nonwoven PLA microfiber mats, there is enough orientation to observe the micro-structure control governed by the initial fiber mat template orientation. This demonstrates that the channeled compositions can be prepared with aligned, oriented, mono-filament micro- and/or nano-fiber, and woven micro- and/or nano-fiber fabrics in addition to the nonwoven fiber mats to achieve a variety of engineered micro- and/or nano-architectures over a wide range of channel fractions.

The tensile, compression, flexure, and impact properties of these micro-channeled specimens were found to decrease with increasing channel content. In all cases, specimens containing micro-channels in the [0] direction had higher mechanical properties than micro-channels in the [90] direction. This data is summarized in FIGS. 10-14.

Figure 10A:
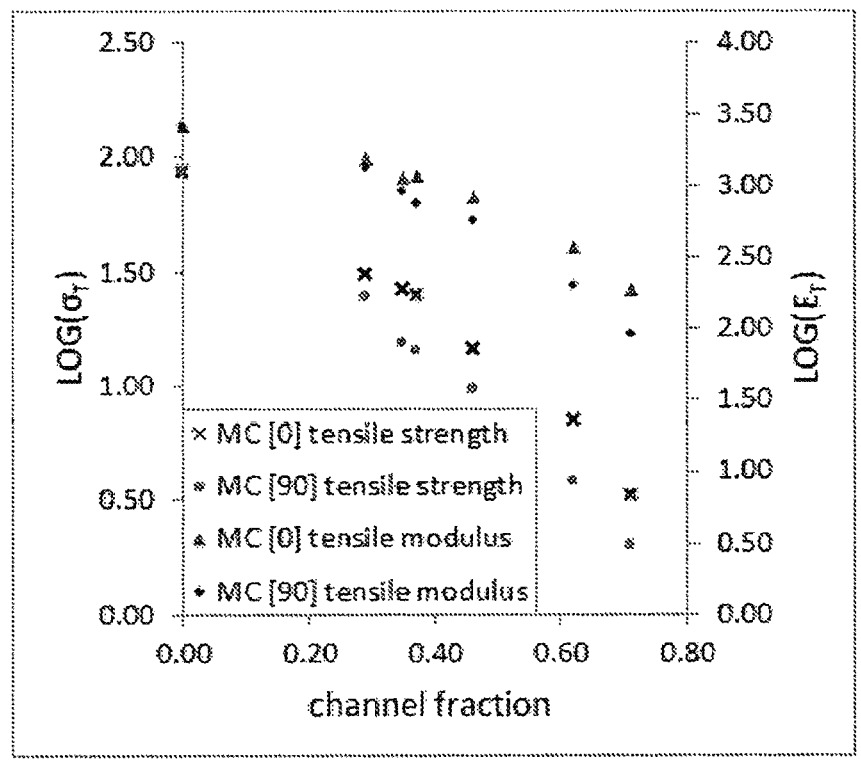
FIGS. 10A-B are semilog plots of tensile strength ($\sigma_T$) and modulus ($E_T$) of micro-channel epoxy containing [0] and [90] oriented micro-channels plotted as a function of micro-channel fraction in 10A and density ($\rho$) in 10B.
Figure 10B:
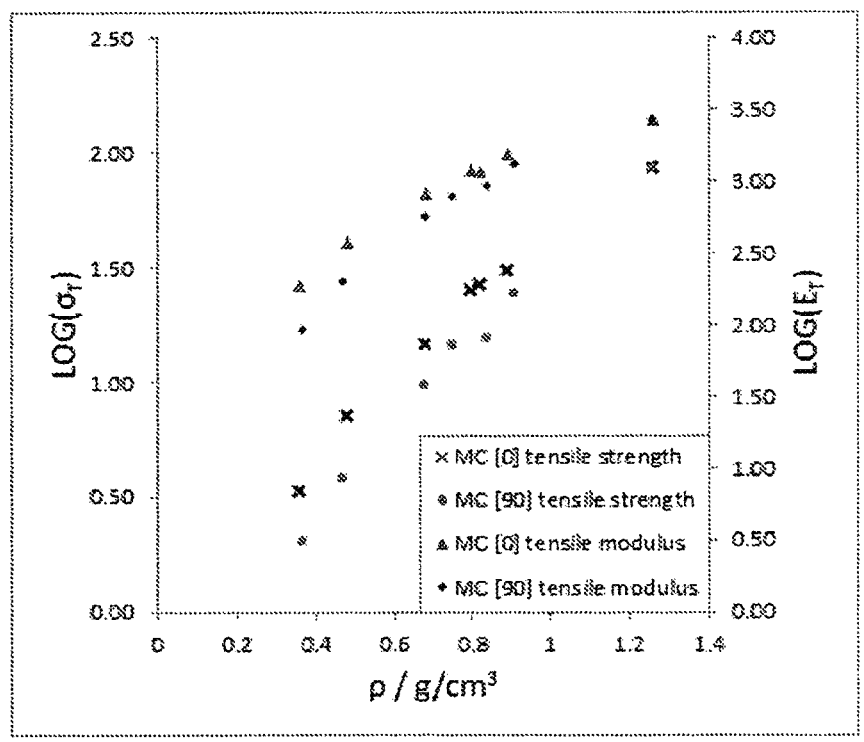

FIG. 10A shows the log of tensile strength ($\sigma_T$) and modulus ($E_T$) of micro-channel epoxy containing [0] and [90] oriented micro-channels plotted as a function of micro-channel fraction. FIG. 10B shows the log of tensile strength ($\sigma_T$) and modulus ($E_T$) of micro-channel epoxy containing [0] and [90] oriented micro-channels plotted as a function of density ($\rho$).

Figure 11A:
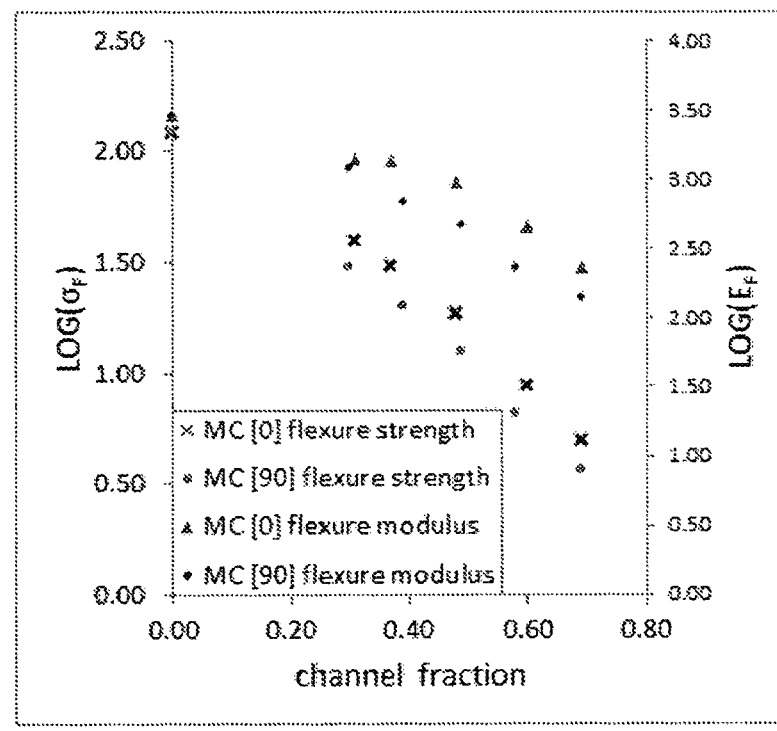
FIGS. 11A-B are semilog plots of three-point flexure strength ($\sigma_F$) and modulus ($E_F$) of micro-channel epoxy containing [0] and [90] oriented micro-channels plotted as a function of micro-channel fraction in 11A and density ($\rho$) in 11B.
Figure 11B:
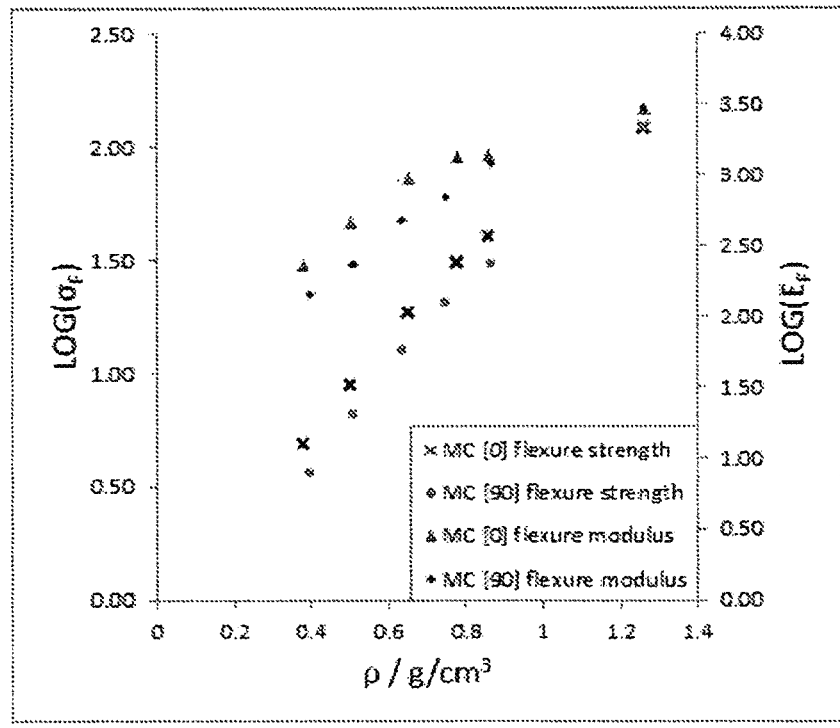

FIG. 11A shows the log of three-point flexure strength ($\sigma_F$) and modulus ($E_F$) of micro-channel epoxy containing [0] and [90] oriented micro-channels plotted as a function of micro-channel fraction. FIG. 11B shows the log of three-point flexure strength ($\sigma_F$) and modulus ($E_F$) of micro-channel epoxy containing [0] and [90] oriented micro-channels plotted as a function of density ($\rho$).

Figure 12A:
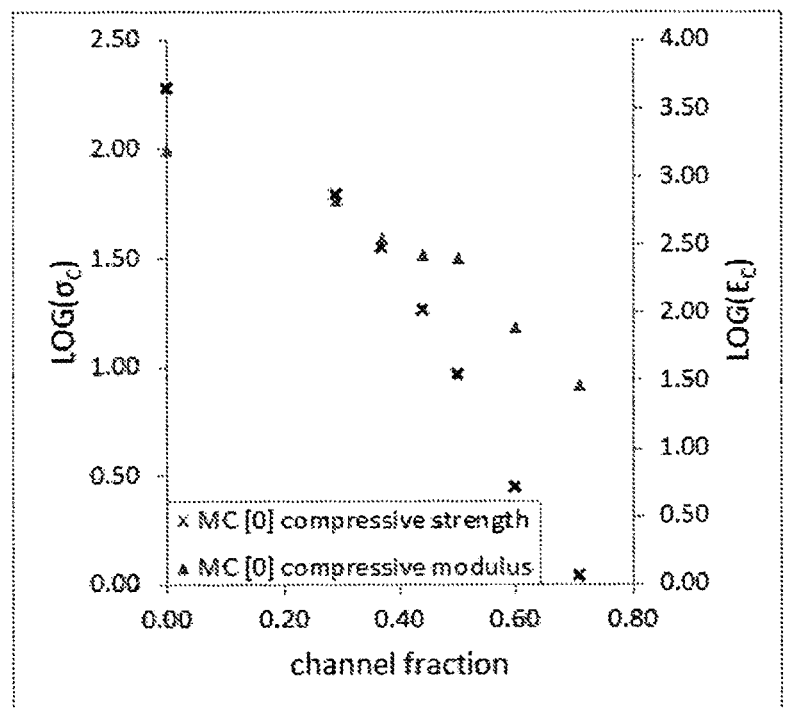
FIGS. 12A-B are semilog plots of compressive strength ($\sigma_C$) and modulus ($E_C$) of micro-channel epoxy containing [0] oriented micro-channels plotted as a function of micro-channel fraction in 12A and density ($\rho$) in 12B.
Figure 12B:
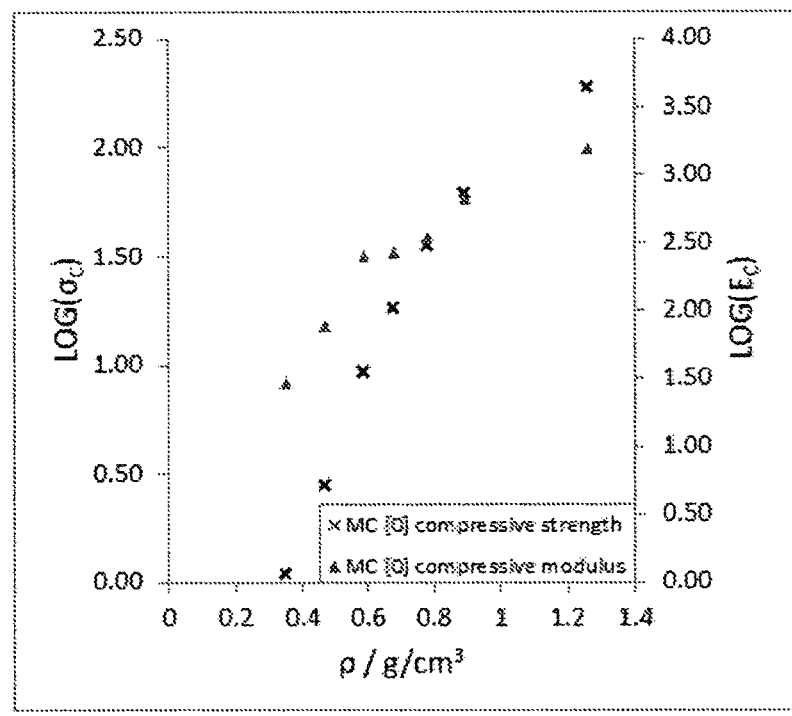

FIG. 12A shows the log of compressive strength ($\sigma_C$) and modulus ($E_C$) of micro-channel epoxy containing [0] oriented micro-channels plotted as a function of micro-channel fraction. FIG. 12B shows the log of compressive strength ($\sigma_C$) and modulus ($E_C$) of micro-channel epoxy containing [0] oriented micro-channels plotted as a function of density ($\rho$).

Figure 13A:
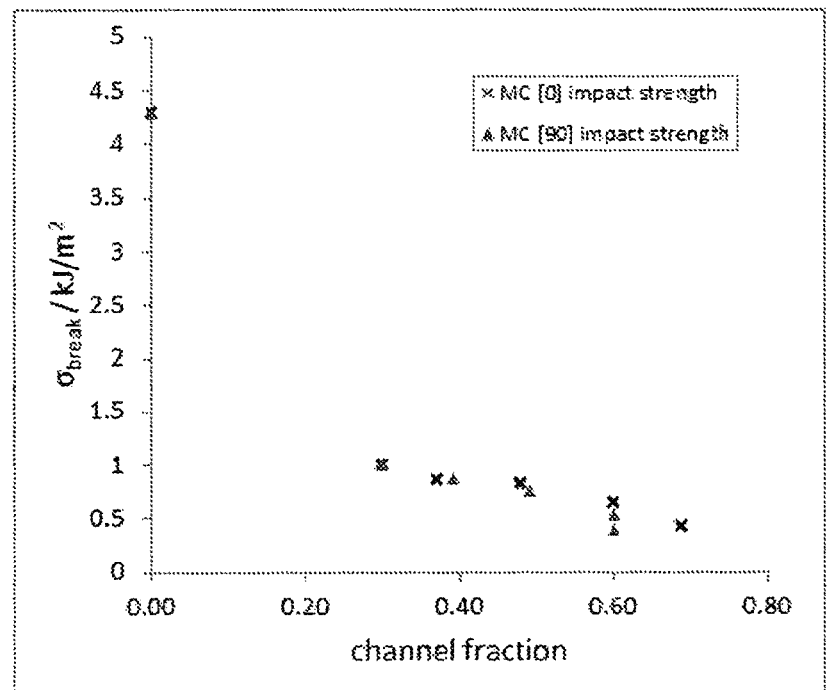
FIGS. 13A-B are plots of impact strength ($\sigma_{break}$) of micro-channel epoxy containing [0] and [90] oriented micro-channels plotted as a function of micro-channel fraction in 13A and density ($\rho$) in 13B.
Figure 13B:
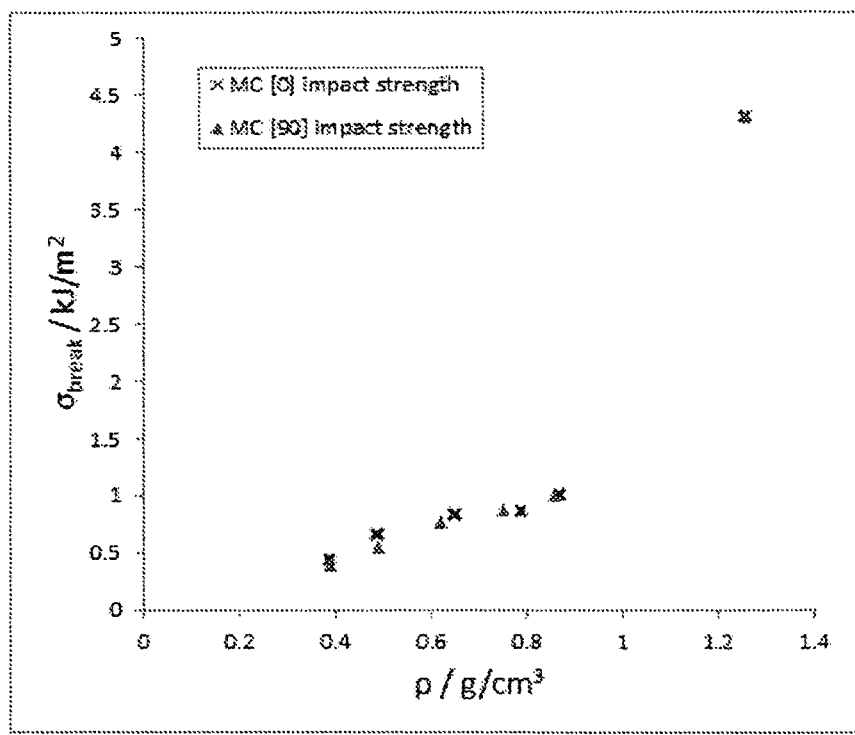

FIG. 13A shows the impact strength ($\sigma_{break}$) of micro-channel epoxy containing [0] and [90] oriented micro-channels plotted as a function of micro-channel fraction. FIG. 13B shows the impact strength ($\sigma_{break}$) of micro-channel epoxy containing [0] and [90] oriented micro-channels plotted as a function of density ($\rho$).

Figure 14A:
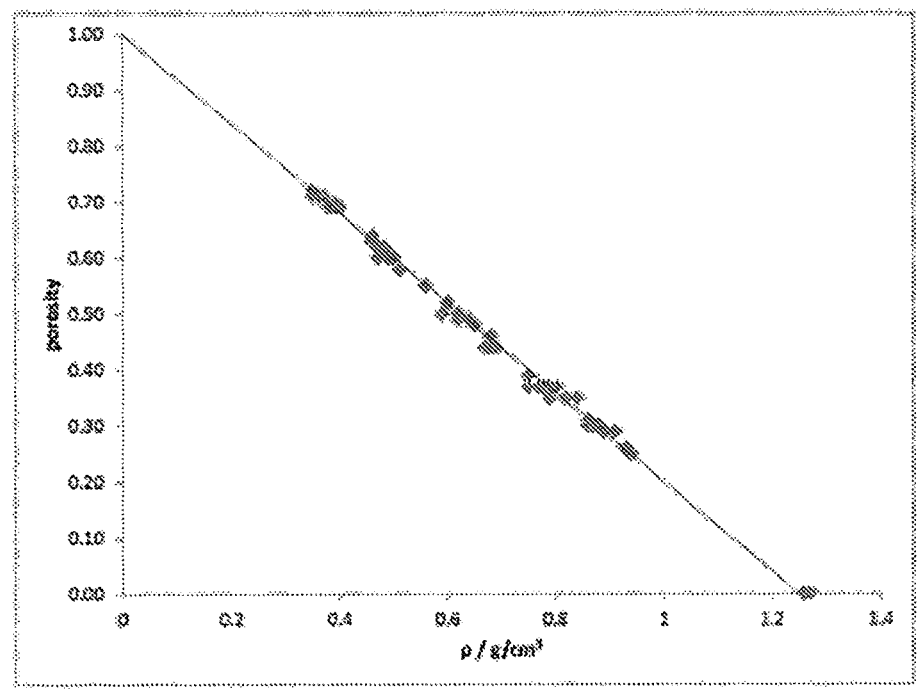
FIG. 14A is a linear plot of the relationship between porosity (i.e. micro-channel fraction) and density ($\rho$).
Figure 14B:
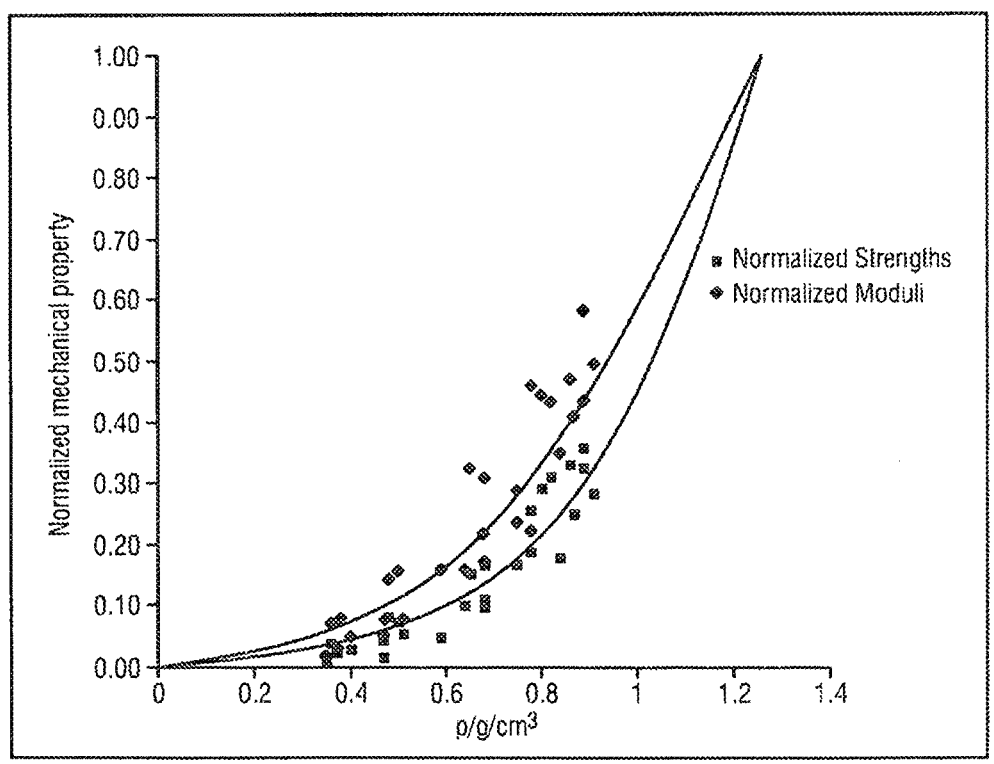
FIG. 14B is an exponential plot of the relationship of normalized mechanical property as a function of density ($\rho$).

It can be seen from FIGS. 10-13 that as the density of the material linearly decreases, an exponential decrease in mechanical properties ensues; this result is anticipated from theoretical studies of low density materials and does in fact occur for all materials we have found in literature searches. This trend is shown in FIGS. 14A-B for the micro-channeled materials. FIG. 14A shows the linear relationship between porosity (i.e. micro-channel fraction) and density ($\rho$). FIG. 14B shows the exponential relationship of normalized mechanical property as a function of density ($\rho$).

Although the mechanical properties of the micro-channeled materials suffer as a consequence of the decreasing bulk density, the mechanical properties are similar to those observed in other porous polymers and ceramics of similar densities. This demonstrates that with further reinforcement strategies, a stronger polymer matrix can be achieved that will augment the mechanical properties without compromising the micro- or nano-channel structure, thus maintaining the excellent thermal insulation performance demonstrated in Example 2. Furthermore, the micro- and nano-channel structure can be tailored in density and architecture, which allows tailoring of the thermal and mechanical properties. The channel architecture may also provide for pathways to insert additional elements for improved multi-functional performance, and hybrid size-gradient materials may allow for further tailoring to achieve particular properties.

The invention being thus described, it will be obvious that the same may be varied in many ways. Such variations are not to be regarded as a departure from the spirit and scope of the inventions and all such modifications are intended to be included within the scope of the following claims.

What is claimed is:

1. A method of preparing a thermal insulation composite composition comprising the steps of:
    infusing a polymer fiber with a liquid polymer, wherein the liquid polymer comprises insulators and/or insulating additives;
    solidifying the liquid polymer by curing to create a polymer matrix; and
    removing the polymer fiber to form channels by thermal degradation, solvation, or selective de-polymerization to form the thermal insulation composite composition, wherein the channel density is between about 50% and about 80%; wherein said channels comprise micro-channels and nano-channels; and wherein said channels are oriented at [0/90]; and wherein the composition has a thermal conductivity of less than 100 mW/m-K.

2. The method of claim 1, wherein said polymer fiber is obtained by electrospinning, forcespinning, charge induction, drawing, melt-blown, self-assembly, template synthesis, or phase separation.

3. The method of claim 1, wherein said polymer matrix is a thermoset polymer or thermoplastic polymer.

4. The method of claim 1, wherein the polymer matrix has an onset of thermal degradation at least about 30° C. higher than the polymer fiber's onset of thermal degradation.

5. The method of claim 1, wherein the polymer fiber comprises micro-fiber and nano-fiber mats and further comprising a step of layering the micro-fiber and nano-fiber mats before the infusing step.

6. The method of claim 1, further comprising the step of adding one or more additional functional ingredients.

7. A method of preparing a thermal insulation composite composition comprising the steps of:
    infusing a polymer fiber with a liquid monomer or oligomer;
    selecting a channel density between 50% and 80% and subsequently polymerizing the liquid monomer or oligomer to create a polymer matrix;
    removing the polymer fiber to form channels by thermal degradation, solvation, or selective de-polymerization to form the thermal insulation composite composition, wherein said channels comprise micro-channels and nano-channels; wherein said channels are oriented at [0/90]; and
    wherein the thermal insulation composite composition has a thermal conductivity of less than 100 mW/m-K.

8. The method of claim 7, wherein said polymer fiber is obtained by electrospinning, forcespinning, charge induction, drawing, melt-blown, self-assembly, template synthesis, or phase separation.

9. The method of claim 7, wherein the polymer matrix has an onset of thermal degradation at least about 30° C. higher than the polymer fiber's onset of thermal degradation.

10. The method of claim 7, wherein the polymer fiber comprises micro-fiber and nano-fiber mats and further comprising a step of layering the micro-fiber and nano-fiber mats before the infusing step.

* * * * *